I. C. STROTH.
ANTISKID DEVICE.
APPLICATION FILED APR. 6, 1918.
1,308,455.
Patented July 1, 1919.
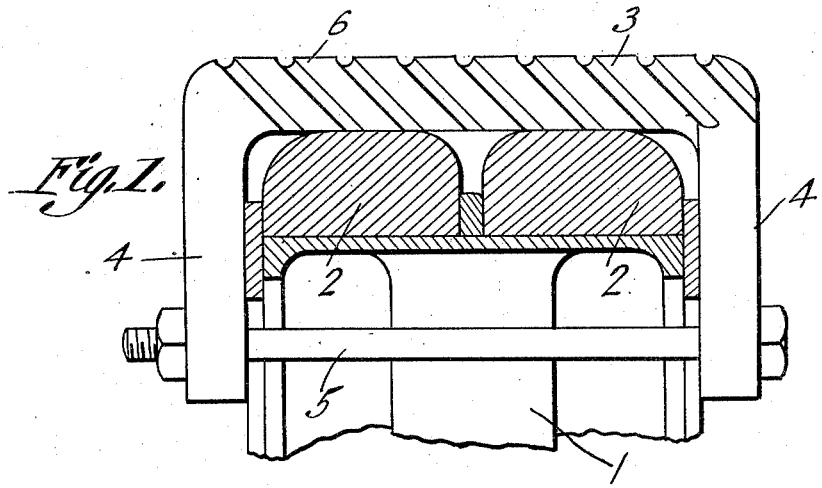
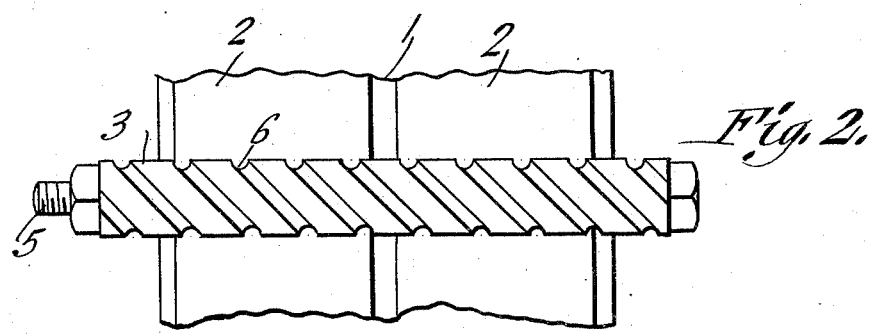
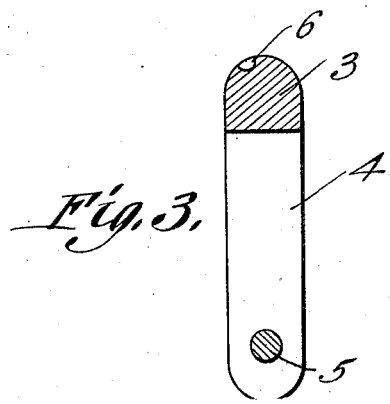
I. C. Stroth
Inventor

UNITED STATES PATENT OFFICE.

IRWINE C. STROTH, OF WELLSTON, OHIO.

ANTISKID DEVICE.

1,308,455.  Specification of Letters Patent.  Patented July 1, 1919.

Application filed April 6, 1918.  Serial No. 227,062.

*To all whom it may concern:*

Be it known that I, IRWINE C. STROTH, a citizen of the United States, residing at Wellston, in the county of Jackson and State of Ohio, have invented a new and useful Antiskid Device, of which the following is a specification.

The subject of this invention is an antiskid device for use on automobile wheels, and the main object of the invention is the provision of an anti-skid device which may be easily applied to a wheel and which will keep the wheel from slipping.

The invention also contemplates the provision of a grooved yoke for straddling the tire and means for locking the yoke in place.

The invention further contemplates the provision of an antiskid device which will not injure the tire.

It is also within the contemplation of the invention to generally improve the construction and enhance the utility of antiskid devices.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1 is a view in elevation of a device constructed in accordance with the invention, a fragment of a wheel to which it is applied being shown in section;

Fig. 2 is a plan view of the same;

Fig. 3 is a cross section of the device.

Referring to the drawing by numerals of reference:—

An ordinary truck wheel is indicated by the numeral 1 and this wheel is supplied with the usual tires 2—2. Extending transversely of the tires is a bar or rod 3 the ends of which are bent, as indicated by the numerals 4, to form a yoke of the bar, which yoke embraces the wheel felly, rim and tire. The bar or yoke is bound in place upon the wheel by means of a bolt 5 which extends through apertures formed in the ends 4. The cross bar of the yoke is grooved, as indicated by the numeral 6.

It will be observed that the grooves 6 are so slanted as to present a hindrance to the sidewise slipping of the wheel to which the device is applied.

Attention is also called to the fact that the tire contacting portion of the yoke is smooth or ungrooved, so as to injure the tire as little as possible.

These yokes may be spaced about the wheel to the extent desired, and will prove most effectual in preventing skidding of the vehicle.

The most important feature of this device resides in disposing the bar or rod 3, at a right-angle to the ends 4, and forming the said rod with a flat bearing face 3′, to fit flat against the tire, while having its outer or tread face rounded and formed with grooves, as this construction in a manner anchors the device in proper position in the tire while properly disposing said tread surface.

Having thus described the invention, what is claimed as new and sought by Letters Patent, is:—

As a new article of manufacture, an antiskid device consisting of a bar disposed horizontally throughout its length and having an outer curved and grooved tread surface and an inner flat face to rest upon the tire, and a yoke formed on said bar to embrace the tire and rim.

In testimony that I claim the foregoing as my own, I have hereto affixed my signature in the presence of two witnesses.

IRWINE C. STROTH.

Witnesses:
L. B. STROTH,
H. F. STROTH.